United States Patent [19]

Mooi et al.

[11] Patent Number: 4,464,249

[45] Date of Patent: Aug. 7, 1984

[54] PLURAL STAGE REFORMING WITH CATALYSTS HAVING A SKEWED DISTRIBUTION OF A PLATINUM-GROUP METAL AND RHENIUM

[75] Inventors: John Mooi; Marvin F. L. Johnson, both of Homewood, Ill.

[73] Assignee: Atlantic Richfield Company, Philadelphia, Pa.

[21] Appl. No.: 84,948

[22] Filed: Oct. 15, 1979

[51] Int. Cl.$^3$ .............................................. C10G 35/06
[52] U.S. Cl. ..................................................... 208/65
[58] Field of Search ........................................ 208/65

[56] References Cited

U.S. PATENT DOCUMENTS

| | | | |
|---|---|---|---|
| 3,516,924 | 6/1970 | Forbes | 208/65 |
| 3,660,271 | 5/1972 | Keith et al. | 208/65 |
| 3,705,094 | 12/1972 | Keith et al. | 208/65 |
| 3,943,050 | 3/1976 | Bertolacini et al. | 208/139 |
| 4,167,473 | 9/1979 | Sikonia | 208/64 |
| 4,174,270 | 11/1979 | Mayes | 208/64 |

Primary Examiner—Curtis R. Davis

Attorney, Agent, or Firm—Donald L. Traut

[57] ABSTRACT

A process for reforming naphthene and paraffin-containing hydrocarbon feeds to increase their aromatic content is disclosed which involves the use of a series of reaction zones containing a supported platinum-group metal catalyst and a supported rhenium catalyst, wherein the distribution of catalytically effective platinum-group metal and rhenium among the series of reaction zones is skewed. The ratio of the percent by weight of the supported platinum-group metal in the catalyst in at least one of the earlier reaction zones of the series of reaction zones to that in the catalyst in at least one of the later reaction zones is in the range of about 1.5 to 10, and preferably in the range of about 2 to about 6. The percent by weight of supported rhenium based on the catalyst in the first zone is preferably less than about 10 percent by weight. Broadly, in the skewed distribution of supported platinum-group metal and rhenium, the ratio of the platinum-group metal to rhenium in the earlier zones is greater than about 1.5, and the ratio of platinum-group metal to rhenium in the later zones is less than about 1.

13 Claims, 1 Drawing Figure

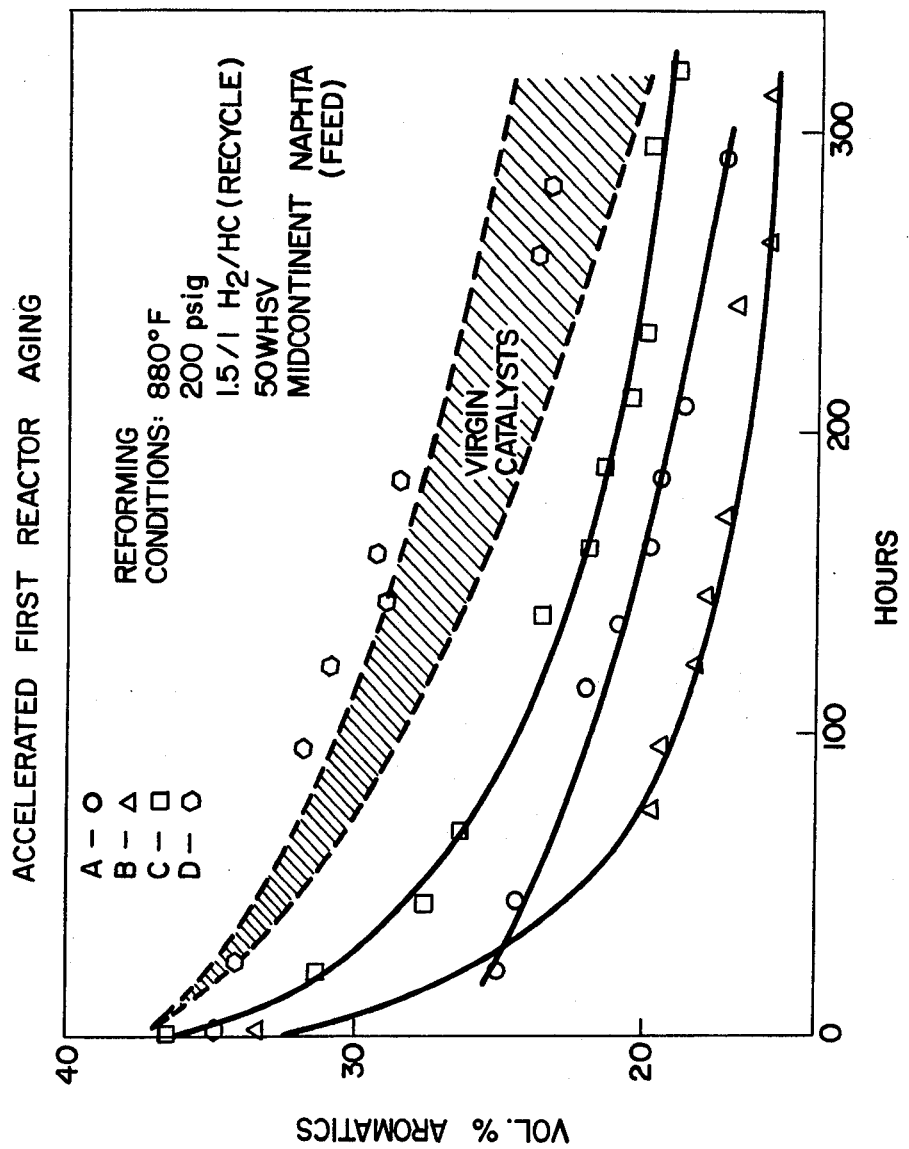

PLURAL STAGE REFORMING WITH CATALYSTS HAVING A SKEWED DISTRIBUTION OF A PLATINUM-GROUP METAL AND RHENIUM

BACKGROUND OF THE INVENTION

The present invention is directed to the catalytic reforming of hydrocarbons. More particularly, this invention is concerned with catalytic reforming in the presence of molecular hydrogen of naphthene and paraffin-containing hydrocarbon fractions boiling in the gasoline or naphtha range, in a multiple fixed bed catalyst conversion system employing both a supported platinum-group metal and rhenium.

In a plurality of reforming zones such as disclosed in U.S. Pat. Nos. 3,392,107 (1968), 3,705,094 (1972), and 3,705,095 (1972) which are expressly and totally incorporated herein by reference, a supported platinum-group metal catalyst having an unskewed distribution was found at unpredictable intervals to lose both activity and selectivity in the earlier zones at a faster rate than was expected. Even employing reactivation procedures such as disclosed in U.S. Pat. Nos. 3,637,524 (1972) and 3,781,219 (1973), both expressly incorporated herein by reference, did not significantly improve this situation. In fact, the reactivation procedure was less effective in restoring the overall activity and selectivity to the platinum-group metal catalyst in the earlier zones than was predicted based upon the more usual performance of such catalysts.

Regeneration throughout this specification and the claims means the process wherein at least a portion of carbonaceous deposits on a reforming catalyst are removed by an oxidative burn-off. Carbonaceous deposits can form on a reforming catalyst during reforming of a hydrocarbon feed.

Reactivation throughout this specification and the claims means the process wherein a previously regenerated catalyst is further treated to disperse or redistribute the supported platinum-group metal and/or to redistribute and recomposite the halogen content of the catalyst to maintain catalytic activity.

BRIEF DESCRIPTION OF THE INVENTION

It is an object of this invention to provide a reforming process for naphthene and paraffin-containing hydrocarbon feeds wherein the catalyst in the process is in a form that can be effectively reactivated.

It is an object of this invention to overcome the difficulties inherent in not employing a skewed distribution of supported platinum-group metal and rhenium in a series of reforming zones.

Other objects of this invention will be clear based on the teachings of this disclosure.

It has been discovered that the presence of $SO_2$ during reactivation can cause a catalyst to age more rapidly, e.g. to lose both activity and stability, than otherwise would be predicted based upon more usual catalyst performance. It has been discovered that the unpredictable intervals mentioned hereinbefore corresponded to times when excessive amounts of $SO_2$ were present during a reactivation. The amount of $SO_2$ present during reactivation that will cause serious deterioration of catalytic properties can be related to the amount of such $SO_2$ picked up by the catalyst. If the amount of sulfur found in a catalyst after reactivation has increased by about 0.5% or more, then the apparent amount of platinum-group metal, e.g. platinum, available for catalytic activity will be decreased. It has been found that the impact due to the pick up of a given percent of such $SO_2$ on catalytic properties, all other factors being equal, decreases as the amount of fully dispersed platinum-group metal, initially present before such $SO_2$ pick up, increases. It has been found that preferably at least about 0.5% platinum-group metal in percent by weight on the catalyst is required in the earlier reaction zones for the optimum benefits of this invention to be achieved.

The FIGURE, discussed in more detail in an example, summarizes the data which demonstrate accelerated aging due to the presence of $SO_2$ during reactivation.

Sulfur from sources other than carbonaceous deposits during a reactivation or regeneration of a supported platinum-group metal catalyst probably arises due to the precipitation of sulfur in the form, for example, of iron sulfide near the first reaction zone. The concentration of sulfur during reactivation or regeneration is greatest in the first reaction zone because of the tendency of sulfide to precipitate near to the first zone. To maintain the activity of the catalyst in the first reaction zone and to insure longer catalyst life, i.e. slower aging rate, it has been found that a greater amount of platinum-group metal is required in the first zone over that which is required by subsequent zones.

The percent by weight throughout this specification and the claims of any component of a catalyst is based upon the total weight of that catalyst with the particular component considered as its element.

The object of this invention has been found to be achieved by the ratio in percent by weight of a supported platinum-group metal to a supported rhenium greater than 1.5, in the earlier reforming zones, i.e. the zones wherein primarily a dehydrogenation of naphthenes occurs. It has been found that the presence of rhenium tends to inhibit and have a deleterious effect upon the activity of a platinum-group metal to catalyze a naphthene dehydrogenation reaction.

The presence of rhenium in the later reforming zones, i.e. the zones wherein primarily isomerization and dehydrocyclization reactions occur, is particularly useful in maintaining catalytic activity. In general, where the percent by weight of a supported platinum-group metal in a catalyst is at least about 0.15%, the stability is approximately proportional to the concentration of rhenium present. That is at minimal levels of platinum which just initiate the hydrocyclization and isomerization reactions, the aging rate of the catalysts is controlled by the concentration of rhenium present.

One embodiment of the method of this invention for reforming naphthene and paraffin-containing hydrocarbon feeds in the presence of molecular hydrogen in a series of catalytic reforming or reaction zones involves at least one of the earlier reaction zones of the series of reforming zones, i.e. a naphthene dehydrogenation zone, using a first catalyst comprising a supported platinum-group metal with rhenium, and involves in a later portion of said plurality reaction zones, i.e. a paraffin dehydrocyclization zone, using a second catalyst comprising a supported platinum-group metal with rhenium, wherein there is a particular distribution of platinum-group metal and rhenium in the first and second catalysts. The distribution of platinum-group metal defined by a ratio of the percent by weight of supported platinum-group metal in the first catalyst to that in the second catalyst is in the range of about 1.5 to 10, and preferably about 2 to 6. Preferably, the ratio of the percent by weight of the supported platinum-group metal to that of the supported rhenium in the first catalyst is greater than about 1.5, but less than about 5, and more preferably in the range of above about 1.5 but less than about 3. The ratio of the percent by weight of the supported platinum-group metal to that of supported rhenium in the second catalyst is less than about 1 and preferably less than about 0.8. This represents a skewed distribution of platinum-group metal with a greater amount of platinum-group metal in the earlier reaction zones of the series of reaction zones.

In addition it has been found and shown in the example that the presence of a catalytically effective amount of rhenium in the first catalyst is necessary to permit a better aging rate than a catalyst without such an amount of rhenium.

In the reforming process of the present invention, a plurality of reaction zones is employed. In the first zone, the predominant reaction is that of dehydrogenation of naphthenes derived from cyclohexane (designated N6). This dehydrogenation reaction of naphthenes is hereinafter and in the claims defined to be a naphthene dehydrogenation. A naphthene dehydrogenation reaction predominates in the first zone for several reasons: relatively high concentration of N6 in the average feed, the rapid kinetics of the naphthene dehydrogenation, and since the naphthene dehydrogenation is endothermic, the temperature falls so rapidly that other reforming reactions requiring more energy are suppressed and become negligible. As the concentration of naphthenes in the feeds decreases and the temperatures increase from earlier zones to later zones, other reactions begin to occur and to predominate. Among these reactions are hydrocracking, generally considered undesirable from a $C_5$ plus yield point of view, isomerization, dehydroisomerization, and dehydrocyclization of paraffins. Each zone can be associated with the principal reaction occurring therein. On this basis, the earlier zones are primarily naphthene dehydrogenation reaction zones, and the later zones are primarily dehydrocyclization reaction zones. In the last zone, the predominant reactions occurring are paraffin dehydrocyclization and hydrocracking and is therefore, a dehydrocyclization zone.

In the process of this invention, the heating of the feedstock can in part be accomplished by indirect exchange, for instance, with the reformate product. In one method of the present invention a designated platinum-group metal rhenium-alumina catalyst is employed in at least the initial, and preferably in all, of the naphthene dehydrogenation zones which have inlet temperatures of at least about 820° F. The catalyst in any lower temperature reactor is usually of the platinum-group metal type and may be selected according to the desires of the operator, but is preferably a platinum-group metal and rhenium-containing catalyst having an alumina support. By the term "inlet temperature(s)" reference is made herein to the temperature(s) of the initial portion of the zone(s) or reactor(s) in question.

In a preferred operation, the inlet temperatures to the naphthene dehydrogenation zones are in the range of about 840° to 920° F. for at least about 80% of the total reforming processing cycle. When there are at least two such naphthene dehydrogenation reactors, it is preferred that the inlet temperature of the first such reactor not exceed about 900° F. while the inlet temperature of the subsequent naphthene dehydrogenation reactors be maintained below about 920° F., for at least about 80% of the total reforming processing time. As a further refinement in this type of operation the total temperature drop in each of the naphthene dehydrogenation zones does not vary more than about 30° F. over at least about 80% of the total reforming cycle. The reforming system can be run so that there is about 75 to 95 weight percent of the theoretical conversion of naphthenes in the overall dehydrogenation zones which provides an effluent from the last-in-series naphthene dehydrogenation reaction zone having less than about 10 weight percent naphthenes above the minimum allowed by the thermodynamics of the system. Frequently, the conditions in the naphthene dehydrogenation zones include pressures of about 50 to 500 psig, preferably about 100 to 350 psig, and weight hourly space velocity (WHSV) for the overall dehydrogenation reaction zones of about 2 to 50 WHSV and preferably about 5 to 20 WHSV.

It is further preferred that inlet temperatures to the dehydrocyclization zones be at least about 20° F. greater than the inlet temperatures of any of the naphthene dehydrogenation zones for at least about 50% of the total reforming process time. Frequently, the inlet temperature of the last reactor of the series exceeds about 930° F. for at least about 25% of the total reforming cycle. The catalyst volume in the total naphthene dehydrogenation zones compared to that in all of the paraffin dehydrocyclization zones is often about 1:20 to 3:1, preferably this ratio is at least about 1:5 when the naphthene content of the gasoline or naphtha feed is at least about 30 volume percent, and the ratio is less than about 1:4 when the paraffin content of the gasoline or naphtha feed is at least about 60 volume percent. Although the system of this invention is described with reference to naphthene dehydrogenation reaction zones and paraffin dehydrocyclization reactions zones, there may be other catalytic reactors in the series which are operated under conditions such that they do not fall in the category of the described naphthene dehydrogenation or paraffin dehydrocyclization zones.

During the reforming operation, hydrogen is supplied to the reaction zones by recycle of hydrogen-containing gases separated from the product effluent. The recycle gas in the method of this invention is relatively high in hydrogen content and low in methane and therefore affords a higher hydrogen partial pressure for a given total pressure and aids in extending catalyst life. Also, the purer hydrogen can be more readily used in other processes. Although the total hydrogen gas stream which is recycled can be passed to the initial naphthene dehydrogenation reaction zone and thence throughout the series of reactors, it is preferred that only a portion of the recycle gases go to the naphthene dehydrogenation reaction zones with there being separate hydrogen gas introduction to the paraffin dehydrocyclization zones. Thus, there may be provided about 0.5 to 8 moles, preferably about 1 to 4 moles, of hydrogen recycle gas per mole of hydrocarbon boiling in the gasoline range introduced into the initial dehydrogenation zone which has an inlet temperature of about 880° F., while there is passed directly to the parrafin dehydrocyclization zones sufficient hydrogen gas to give in such zones about 7 to 30 moles, preferably about 8 to 15 moles, of total hydrogen recycle gas per mole of hydrocarbon boiling in the gasoline range passing into the paraffin dehydrocyclization zones. Of course the total gas to such dehydrocyclization zones includes that coming from the preceding reactors as well as any portion of the recycle gas passed directly into the paraffin dehydrocyclization zones. The latter addition, that is, the direct charging of recycle gas to the paraffin dehydrocyclization zones, is usually at least about 3 moles of hydrogen recycle gas, preferably at least about 5 moles per mole of hydrocarbon boiling in the gasoline range passing into such zones.

The reforming catalyst useful in the present invention comprises a solid porous support, e.g., alumina, a platinum-group metal and rhenium. It is preferred that the solid porous support be a material comprising a major amount of alumina having a surface area of about 25 m.$^2$/gm. to about 600 m.$^2$/gm. or more. The solid porous support comprises a major proportion, preferably at least about 80%, and more preferably at least about 90%, by weight of the catalyst. The preferred catalyst support, or base, is an alumina derived from hydrous alumina predominating in alumina trihydrate, alumina monohydrate, amorphous hydrous alumina and mixtures thereof, more preferably, alumina monohydrate, amorphous hydrous alumina and mixtures thereof, which alumina when formed as pellets and calcined, has an apparent bulk density of about 0.60 gm./cc. to about 0.85 gm./cc., pore volume of about 0.45 ml./gm. to about 0.70 ml./gm., and surface area of about 100 m.$^2$/gm. to about 500 m.$^2$/gm. The solid porous support may contain, in addition, minor proportions of other well known refractory inorganic oxides such as silica, zirconia, magnesia and the like. However, the most preferred support is substantially pure alumina derived from hydrous alumina predominating in alumina monohydrate.

The alumina support may be synthetically prepared in any suitable manner and may be activated prior to use by one or more treatments including drying, calcination, steaming and the like. Thus, for instance, hydrated alumina in the form of a hydrogel can be precipitated from an aqueous solution of a soluble aluminum salt such as aluminum chloride. Ammonium hydroxide is a useful agent for effecting the precipitation. Control of the pH to maintain it within the values of about 7 to about 10 during the precipitation is desirable for obtaining a good rate of conversion. Extraneous ions, such as halide ions, which are introduced in preparing the hydrogel, can, if desired, be removed by filtering the alumina hydrogen from its mother liquor and washing the filter cake with water. Also, if desired, the hydrogel can be aged, say for a period of several days. The effect of such aging is to build up the concentration of alumina trihydrate in the hydrogel. Such trihydrate formation can also be enhanced by seeding an aqueous slurry of the hydrogel with alumina trihydrate crystallites, for example, gibbsite.

The alumina may be formed into macrosize particles of any shape such as pills, cakes, extrudates, powders, granules, spheres, and the like using conventional methods. The size selected for the macrosize particles can be dependent upon the intended environment in which the final catalyst is to be used—as, for example, whether in a fixed or moving bed reaction system. Thus, for example, where as in the preferred embodiment of the present invention, the final catalyst is designed for use in hydrocarbon reforming operations employing a fixed bed of catalyst, the alumina will preferably be formed into particles having a minimum dimension of at least about 0.01 inch and a maximum dimension up to about one-half inch or one inch or more. Spherical particles having a diameter of about 0.01 inch to about 0.25 inch, preferably about 0.03 inch to about 0.15 inch, are often useful, especially in a moving bed reforming operation.

As indicated above, the catalyst utilized in the present invention also contains a platinum-group metal. The platinum-group metals include platinum, palladium, rhodium, iridium, ruthenium, osmium and the like with platinum being preferred for use in the present invention. The platinum-group metal, such as platinum, may exist within the final catalyst at least in part as a compound such as an oxide, sulfide, halide and the like, or in the elemental state. Generally, the amount of the platinum-group metal component present in the final catalyst is small compared to the quantities of the other components combined therewith. In fact, the platinum-group metal component generally comprises from about 0.01% to about 3.0%, preferably from about 0.05% to about 1.0%, by weight of the catalyst, calculated on an elemental basis.

The platinum group component may be incorporated in the catalyst in any suitable manner, such as by coprecipitation or cogellation with the alumina support, ion-exchange with the alumina support and/or alumina hydrogel, or by the impregnation of the alumina support and/or alumina hydrogel at any stage in its preparation and either after or before calcination of the alumina hydrogel. One preferred method for adding the platinum group metal to the alumina support involves the utilization of a water soluble compound of the platinum group metal to impregnate the alumina support prior to calcination. For example, platinum may be added to the support by comingling the uncalcined alumina with an aqueous solution of chloroplatinic acid. Other water-soluble compounds of platinum may be employed as impregnation solutions, including, for example, ammonium chloroplatinate and platinum chloride. The utilization of a platinum-chlorine compound, such as chloroplatinic acid, is preferred since it facilitates the incorporation of both the platinum and at least a minor quantity of the optional halogen component of the catalyst, described hereinafter. It is preferred to impregnate the support with the platinum-group metal and rhenium when it is in a calcined state. Following this impregnation, the resulting impregnated support is shaped (e.g., extruded), dried and subjected to a high temperature calcination or oxidation procedure at a temperature in the range from about 700° F. to about 1500° F., preferably from about 850° F. to about 1300° F., for a period of time from about one hour to about 20 hours, preferably from about one hour to about five hours. The major portion of the optional halogen component may be added to this otherwise fully composited calcined catalyst by contacting this catalyst with a substantially anhydrous stream of halogen-containing gas.

Another essential constituent of the catalyst utilized in the present invention is an additional component exemplified by rhenium. This component may be present as an elemental metal, as a chemical compound, such as the oxide, sulfide, or halide, or in a physical or chemical association with the alumina support and/or the other components of the catalyst. Generally, the rhenium is utilized in an amount which results in a catalyst containing about 0.01% to about 5%, preferably about 0.05% to about 1.0%, by weight of rhenium, calculated as the elemental metal. The rhenium component may be incorporated in the catalyst in any suitable manner and at any stage in the preparation of the catalyst. The procedure for incorporating the rhenium component may involve the impregnation of the alumina support or its precursor either before, during or after the time the other components referred to above are added. The impregnation solution can in some cases be an aqueous solution of a suitable rhenium salt such as ammonium perrhenate, and the like salts or it may be an aqueous solution of perrhenic acid. In addition, aqueous solutions of rhenium halides such as the chloride may be used if desired. It is preferred to use perrhenic acid as the source of rhenium for the catalysts utilized in the present invention. In general, the rhenium component can be impregnated either prior to, simultaneously with, or after the platinum-group metal component is added to the support. However, it has been found that best results are achieved when the rhenium component is impregnated simultaneously with the platinum group component. In fact, a preferred impregnation solution contains chloroplatinic acid and perrhenic acid. In the instance where the catalyst support, e.g., alumina derived from hydrous alumina predominating in alumina monohydrate, is formed into spheres using the conventional oil drop method, it is preferred to add the platinum-group metal and rhenium after calcination of the spheroidal particles.

An optional constituent of the catalyst used in the present invention is a halogen component. Although the precise chemistry of the association of the halogen component with the alumina support is not entirely known, it is customary in the art to refer to the halogen component as being combined with the alumina support, or with the other ingredients of the catalyst. This combined halogen may be fluorine, chlorine, bromine, and mixtures thereof. Of these, fluorine and, particularly, chlorine are preferred for the purposes of the present invention. The halogen may be added to the alumina support in any suitable manner, either during preparation of the support, or before or after the addition of the catalytically active metallic components. For example, at least a portion of the halogen may be added at any stage of the preparation of the support, or to the calcined catalyst support, as an aqueous solution of an acid such as hydrogen fluoride, hydrogen chloride, hydrogen bromide and the like or as a substantially anhydrous gaseous stream of these halogen-containing components. The halogen component, or a portion thereof, may be composited with alumina during the impregnation of the latter with the platinum group component and/or rhenium component; for example, through the utilization of a mixture of chloroplatinic acid and/or perrhenic acid and hydrogen chloride. In another situation, the alumina hydrogel which is typically utilized to form the alumina component may contain halogen and thus contribute at least a portion of the halogen component to the final composite. When the catalyst is prepared by impregnating calcined, formed alumina, it is preferred to impregnate the support simultaneously with the platinum group metal, rhenium component and halogen. In any event, the halogen may be added in such a manner as to result in a fully composited catalyst that contains about 0.1% to about 1.5% and preferably about 0.6% to about 1.3% by weight of halogen calculated on an elemental basis. During both steps (1) and (2) of the present invention, the halogen content of the catalyst can be maintained at or restored to the desired level by the addition of halogen-containing compounds, such as carbon tetrachloride, trichloroethanes, t-butyl chloride and the like, to the hydrocarbon before entering the reaction zone.

The final fully composited catalyst prepared, for example, by a method set forth above, is generally dried at a temperature of about 200° F. to about 600° F. for a period of about 2 to 24 hours or more and finally calcined at a temperature of about 700° F. to about 1300° F., preferably about 850° F. to about 1100° F. for a period of about ¼ hour to about 20 hours and preferably about ¼ hour to about 5 hours.

The resultant calcined catalyst may be subjected to reduction prior to use in reforming hydrocarbons. This step is designed to insure chemical reduction of at least a portion of the metallic components.

The reducing media may be contacted with the calcined catalyst at a temperature of about 500° F. to about 1200° F. and at a pressure in the range of about 0 psig. to about 500 psig. and for a period of time of about 0.5 hours to about 10 hours or more and in any event, for a time which is effective to chemically reduce at least a portion, preferably a major portion, of each of the metallic components, i.e., platinum-group metal and rhenium component, of the catalyst. In a preferred embodiment, the calcined catalyst is contacted with the reducing media, preferably hydrogen-containing gas, at a temperature within the range of about 500° F. to about 650° F. for a period of time sufficient to effect chemical reduction of at least a portion of the metallic components of the catalyst, preferably for a period of time of about 0.5 hours to about 10 hours. By chemical reduction is meant the lowering of oxidation states of the metallic components below the oxidation state of the metallic component in the unreduced catalyst. For example, the unreduced catalyst may contain platinum compounds in which the platinum has an oxidation state which can be reduced to elemental platinum by contacting the unreduced catalyst with hydrogen. This reduction treatment is preferably performed in situ, (i.e. in the reaction zone in which it is to be used) as part of a start-up operation using fresh unreduced catalyst or regenerated (i.e. conventionally regenerated by treatment with an oxygen-containing gas stream) catalyst. Thus, the process of the present invention may be practiced using virgin catalyst and/or catalyst that has previously been used to reform hydrocarbon and has been subsequently subjected to conventional treatments to restore, e.g. regenerate and/or reactivate, the hydrocarbon reforming activity and stability of the catalyst.

In addition to being desirable to have a halide component on the reforming catalyst, it is especially useful to maintain at least about 0.2 percent and preferably at least 1.0 percent by weight halide on the catalyst. To maintain such halide component, two methods disclosed in U.S. Pat. Nos. 3,637,524 (1972) and 3,781,219 (1973) are particularly useful.

During treatment of the catalyst with the chlorine and oxygen-containing gas the temperature of the gaseous stream can be in the range of about 600° to 950° F. If one desires to disperse the promoting metals during this operation as well as deposit the chloride, the gas temperature is advantageously maintained in the range of about 800° to 950° F., whereas if metal dispersion is not desired in this step of the operation the chloride addition can be accomplished at lower temperatures of the order of about 600° to 750° F. The total pressure of the system during this gas treatment is usually about 50 to 500 pounds per square inch gauge (psig) and is preferably about 175 to 350 psig.

During initial contact of the regenerated catalyst with the chlorine-containing gaseous stream, deposition of the chloride component apparently occurs primarily in the initial portion of the catalyst bed. When the treatment begins the catalyst often has a surface area of about 150 to 250 square meters per gram and a chloride content of about 0.05 to 0.8 weight percent, and at least about 0.2 weight percent less than when in the virgin state, more often at least about 0.4 weight percent less. During the chloride deposition the amount of chloride added, which is a function of the amount of chlorine in the gaseous stream and the time of contact is such that at least about 0.2, preferably at least about 0.3, weight percent chlorine or chloride, is added based on the total catalyst inventory in the bed or beds treated.

A treatment with a substantially chlorine-free gas can be continued to distribute the previously applied chloride substantially throughout the catalyst bed, if the gas contains water vapor. After the chloride distribution throughout the catalyst bed, the catalyst on an average basis can contain about 0.4 to 1 weight percent chloride, with the chloride added usually being at least about 0.2, preferably at least about 0.3, weight percent based on the catalyst. The time of chlorine addition is such as to accomplish the desired chloride addition. Generally, a relatively short period of deposition is desired since the preferred goal is to deposit the chloride in the first portion of the catalyst bed without undue contact with water vapor. The treatment with the chlorine-containing gaseous stream often continues with respect to a given catalyst bed for a time of up to about 4 hours, preferably less than about 3 hours or even less than about 1 hour. By limiting this time and the amount of water present during chloride deposition, subsequent distribution of this component can be accomplished without unduly extended contact of the catalyst with the chloride-containing gas stream at the elevated treating temperatures which can cause considerable damage to the catalyst, e.g. by a decrease in surface area.

EXAMPLE

This example is intended to illustrate this invention. Variations on the specific embodiments disclosed are clear to one of skill in the art and are intended to be within the scope of this invention.

A series of catalyst compositions were tested in an accelerated aging test simulating severe first reactor conditions. The tests were run on both the virgin catalysts and catalysts reactivated in the presence of $SO_2$, which simulates the harmful effects on a first reactor catalyst after reactivation in a reforming unit contaminated with sulfur.

The results of reforming with selected catalysts both before and after reactivation are shown in the FIGURE and discussed hereinafter. The hatched area in the FIGURE represents the data for all virgin catalysts A through D. The spread is due to experimental scatter. Catalyst A (0.35% Pt/0.35% Re) and Catalyst B (0.35% Pt/0.0% Re) were both severely harmed by the reactivation in $SO_2$ in that they showed a loss of both activity and stability. Catalyst C (0.9% Pt/0.0% Re) in its virgin condition, was as active and stable as virgin Catalyst A. Catalyst C did not lose initial activity with an $SO_2$ reactivation or lose stability to the degree shown by the $SO_2$ reactivated Catalyst A. Catalyst D (0.6% Pt/0.35% Re) composition appears to be extremely good for the first reactor; after an $SO_2$ treatment, Catalyst D is almost equal in initial performance to virgin Catalyst A and in general, is about equivalent in overall performance to all virgin catalysts.

Reforming conditions are given in the FIGURE for the virgin catalysts and the $SO_2$ reactivated catalysts. The process for reactivation in the presence of $SO_2$, i.e. an $SO_2$ reactivation process, is as follows: 32 grams of regenerated catalyst is heated in a furnace to 950° F. in a stream of gas flowing at a rate of 1.2 standard cubic feet per hour (scfh). This gas contains 1260 ppm $SO_2$ and 2800 ppm $H_2O$ with the balance being nitrogen. After one hour, the system becomes stable at 950° F. Air was added to the gas mixture at the rate of 0.4 scfh to produce a mixture containing about 5% nitrogen. After a further 15 minute interval subsequent to the addition of air, trichloroethane addition was started and continued for 1¼ hours during which time 0.70% chloride, based upon total catalyst weight, was added to the catalyst. Heating without further addition of chloride was continued for 1 hour and 40 minutes. After this 1 hour and 40 minutes, the system was rapidly cooled and the catalyst removed from the furnace. Only the most severely contaminated catalyst was further tested by reforming a mid-continent naphtha feed having the following distillation parameters measured according to ASTM D86 procedure:

Initial Boiling Point 250° F.
10%—70° F.
50%—292° F.
90%—330° F.
End Boiling Point 375° F.

In the graph of the FIGURE, aromatics content of the liquid product is shown as a function of time on stream. Since the reactions taking place at first reactor conditions are primarily naphthene dehydrogenation the percent aromatics is a good indication of catalyst activity. The conversion to paraffins is on the order of 2%. The volume percent aromatics plotted is based on liquid product only. Yield calculations indicated $C_5$ plus yields of 95 to 98%.

The initial activity of all the catalyst is high with the exception of the $SO_2$ reactivated Catalyst A. This catalyst appears to be severely poisoned by the 1.86% sulfur deposited on it during the reactivation. Since the Catalyst D did not show the same poisoning due to sulfur, it appears that sulfur sensitivity is a function of Pt/Re ratio and that sulfur sensitivity during reaction is reduced if the Pt/Re ratio is greater than about 1.5.

A full scale reforming operation of this invention employing plural zones is carried out by following the detailed example 1 of U.S. Pat. No. 3,392,107 (1968) with the significant difference that a skewed distribution given hereinafter of platinum on alumina is used. In percent by weight, based upon the total weight of the catalyst with the metal calculated as in an elemental state, in Reactor No. 1, the platinum is present on the catalyst at 0.6% and the rhenium is present on the catalyst at 0.35%; in Reactor No. 2, the platinum is present on the catalyst at 0.35% and the rhenium is present on the catalyst at 0.35%; in Reactor No. 3, the platinum is present on the catalyst at 0.35% and the rhenium is present on the catalyst at 0.35%; and finally, in Reactor No. 4, the platinum is present on the catalyst at 0.25% and the rhenium is present on the catalyst at 0.85%.

The embodiments of the invention in which an exclusive property or privilege is claimed are defined as follows:

1. In a method for reforming a naphthene and paraffin-containing hydrocarbon feed boiling in the gasoline or naphtha range in the presence of molecular hydrogen wherein a series of zones are employed to provide reformates of at least about 90 RON and wherein there are hydrogen-containing recycled gas and at least one reactivation, the improvement which comprises providing at least one naphthene dehydrogenation zone in an early portion of said series of reaction zones, said naphthene dehydrogenation zone having a first catalyst comprising a catalytically effective amount of a supported platinum-group metal and rhenium and providing at least one paraffin dehydrocyclization zone in a later portion of said series of reaction zones, said paraffin dehydrocyclization zone having a second catalyst comprising a catalytically effective amount of a supported platinum-group metal and rhenium wherein the ratio of the percent by weight of the supported platinum-group metal in the first catalyst to that in the second catalyst is in the range of about 1.5 to about 10, introducing a hydrocarbon boiling in the gasoline or naphtha range into such naphthene dehydrogenation zone at an inlet temperature of at least about 820° F., passing effluent from said naphthene dehydrogenation zone serially through the reaction zone wherein the inlet temperature of a paraffin dehydrocyclization zone is in the range of about 900° to 1000° F. and controlled to provide a reformate at least about 90 RON.

2. In a method for reforming a naphthene and paraffin-containing hydrocarbon feed boiling in the gasoline or naphtha range in the presence of molecular hydrogen wherein a series of zones are employed to provide reformates of at least about 90 RON and wherein there are hydrogen-containing recycled gas and at least one reactivation, the improvement which comprises providing at least one naphthene dehydrogenation zone in an early portion of said series of reaction zones, said naphthene dehydrogenation zone having a first catalyst comprising a catalytically effective amount of a supported platinum-group metal and rhenium and providing at least one paraffin dehydrocyclization zone in a later portion of said series of reaction zones, said paraffin dehydrocyclization zone having a second catalyst comprising a catalytically effective amount of a supported platinum-group metal and rhenium wherein the ratio of the percent by weight of the supported platinum-group metal in the first catalyst to that in the second catalyst is in the range of about 1.5 to about 10, introducing a hydrocarbon boiling in the gasoline or naphtha range into such naphthene dehydrogenation zone at an inlet temperature of at least about 820° F., passing effluent from said naphthene dehydrogenation zone serially through the reaction zone wherein the inlet temperature of a paraffin dehydrocyclization zone is in the range of about 900° to 1000° F. and controlled to provide a reformate at least about 90 RON and wherein there is present during said at least one reactivation a potentially deleterious amount of $SO_2$.

3. The improved process of claim 2, wherein said potentially deleterious amount of $SO_2$ causes an increase in sulfur content of some catalyst by at least about 0.5% by weight.

4. The method of claims 1 or 2, wherein the concentration of platinum-group metal in the first catalyst is at least about 0.5% by weight.

5. The improved process of claim 1, or 2 wherein the first catalyst contains less than about 10 percent by weight of supported rhenium.

6. The improved process of claim 1, or 2 wherein the ratio of the percent by weight of supported platinum-group metal to that of rhenium in the first catalyst is greater than about 1.5 and that ratio in the second catalyst is less than about 1.

7. The improved process of claims 1, or 2, wherein the platinum-group metal is platinum.

8. The improved process of claim 7, wherein the first and second catalyst comprise activated alumina as the base for the supported platinum-group metal and supported rhenium.

9. The improved method of claim 8, wherein there is provided in said paraffin dehydrocyclization zone a vaporous chlorine-containing agent in an amount to supply about 0.1 to 100 ppm chlorine based on the weight of said hydrocarbon feed, while providing said paraffin dehydrocyclization zone about 10 to 1000 ppm $H_2O$ based on the weight of hydrocarbon boiling in the gasoline range which is charged to said zone.

10. The improved process of claim 7, wherein the inlet temperature of the naphthene dehydrogenation zone is in the range of about 840° to 920° F.

11. The improved method of claim 10, wherein the mole ratio of recycled gas to hydrocarbon in the naphthene dehydrogenation zone is in the range of about 1:1 to about 6:1 and the mole ratio of the recycled gas to hydrocarbon in the paraffin dehydrocyclization zone is about 8:1 to 20:1.

12. The improved method of claim 1, wherein the sulfur content of the total hydrocarbon feed and recycled gas passing to said naphthene dehydrogenation zone is less than about 10 ppm.

13. The improved method of claim 12, wherein the impurity levels of both the hydrocarbon feed and recycled gas are below about 10 ppm water, 5 ppm sulfur, and 2 ppm combined nitrogen.

* * * * *